United States Patent [19]

Wenzel

[11] Patent Number: 5,401,080
[45] Date of Patent: Mar. 28, 1995

[54] SPINDLE HUB MOUNT UNIT

[76] Inventor: Verlyn C. Wenzel, EP1257 Balsam St., Stratford, Wis. 54484

[21] Appl. No.: 97,379

[22] Filed: Jul. 23, 1993

[51] Int. Cl.6 ............................................. B60B 35/04
[52] U.S. Cl. ..................................... 301/132; 301/131
[58] Field of Search ...................... 301/124.1, 126, 130, 301/131, 132

[56] References Cited

U.S. PATENT DOCUMENTS

| | | | |
|---|---|---|---|
| 784,383 | 3/1905 | Butler | 301/132 X |
| 3,434,271 | 3/1969 | Gaunt et al. | |
| 3,552,813 | 1/1971 | Brescia, Jr. et al. | |
| 3,915,504 | 10/1975 | Bauer | |
| 4,016,947 | 4/1977 | Chamberlain | |
| 4,080,003 | 3/1978 | Boughton | 301/132 X |
| 4,121,871 | 10/1978 | Adams, Jr. | |
| 4,127,306 | 11/1978 | Foster | |
| 4,317,596 | 3/1982 | Lemmon | |
| 4,381,874 | 5/1983 | Strader | |
| 4,401,349 | 8/1983 | Campbell | |
| 4,437,537 | 3/1984 | Ausmus | |
| 4,540,220 | 9/1985 | Roeth et al. | |
| 4,582,448 | 4/1986 | Costello et al. | |
| 4,627,666 | 12/1986 | O'Neill | |
| 4,703,977 | 11/1987 | Haanschoten | |
| 4,768,839 | 9/1988 | Spindler | 301/131 X |
| 4,811,992 | 3/1989 | Steiner | |
| 4,828,328 | 5/1989 | Bowman | |
| 4,890,889 | 1/1990 | Burgett | |
| 4,995,636 | 2/1991 | Hall et al. | |
| 5,031,967 | 7/1991 | Svensson | |
| 5,076,111 | 12/1991 | Love | |
| 5,090,776 | 2/1992 | Van Breemen | |
| 5,090,778 | 2/1992 | Laudszun et al. | |
| 5,171,068 | 12/1992 | Wu | |
| 5,197,785 | 3/1993 | Berry | |
| 5,215,387 | 6/1993 | Bertetti et al. | |
| 5,226,691 | 7/1993 | Kane | 301/132 |

FOREIGN PATENT DOCUMENTS

| | | | |
|---|---|---|---|
| 356830 | 1/1905 | France | 301/132 |
| 509895 | 8/1920 | France | 301/132 |
| 254860 | 7/1926 | United Kingdom | 301/130 |

Primary Examiner—Russell D. Stormer
Attorney, Agent, or Firm—Charles F. Meroni, Jr.

[57] ABSTRACT

A spindle hub mount unit for attachment to a wheel spindle. The improvement of a plate. Holes are located in the plate to assist in securing the plate to a machine frame. An upright stub axle sleeve is mounted on the plate. The plate has an offset plate hole with a lower end of the stub axle sleeve mounted in the offset plate hole. Welds attach the stub axle sleeve to the plate when set into the offset plate hole. Gussets are mounted on the plate having gusset edges. Welds join the gusset edges to an outside surface of the upright stub axle sleeve and to the plate. Aligned opposing stub axle sleeve holes extend through the stub axle sleeve above the plate with a bolt having a bolt shank extended through the aligned opposing stub axle sleeve holes and a nut is attached to a free end of the bolt for securing a lower end of a wheel spindle interiorly of the stub axle sleeve in bolted assembly together. A pair of axially spaced set screws extend through the upright stub axle sleeve for engagement with an exterior surface of a wheel spindle to secure a wheel spindle from pivoting relative to the upright stub axle sleeve when mounted in assembly together.

9 Claims, 4 Drawing Sheets

SPINDLE HUB MOUNT UNIT

BACKGROUND OF THE INVENTION

FIELD OF THE INVENTION

The purpose of this unit is to provide a means to mount the spindle hub and wheel assembly to the main frame of an agriculture forage chopper or other towed implement. The prior unit that has been used by others such as John Deere is constructed as a solid piece so that the spindle cannot be separately removed and replaced. All parts are welded to a base plate that is adapted to be bolted to a chopper housing. An offset from center mounting of the spindle on the base plate is used to provide a small range of height adjustments. From the offset hole in the base plate, a spindle shaft is welded to the base plate. A bracket is formed to a "C" shape and has a hole through which the spindle is inserted. This is then welded to the spindle and base plate. The unit as built and sold by John Deere constitutes a solid piece or block of welded metal parts and with no chance to replace any one item. The unit is sold for use on a Forage Harvester and a replacement unit can be purchased when required but a worn out individual component can not be separately purchased for replacement purposes when required. Other prior an units are of the type shown in U.S. Pat. No. 4,121,871.

According to my invention, I have provided a new spindle hub mount unit which uses a base plate with an offset hole, and which base plate hole accepts a tubular support piece or stub axle sleeve. This piece or upright stub axle sleeve is welded to the base and three (3) gussets are welded to support the tube on the plate. The upright tube has a transverse pair of holes near its base which passes through both walls on center, to accept means such as a pin or a bolt to hold the spindle at a predetermined dimension and position in the upright stub axle sleeve. Also, the tube has at least two tapped holes for at least a pair of set screws to secure the spindle from movement inside the tube.

The inside diameter of the tube support accepts the outside diameter of the spindle. By using this means to mount the wheel, spindle to hub assembly, it is possible to replace the spindle, bearings, hub, or even the base mount independently. The need to purchase the complete assembly is eliminated as required before on equipment of the type described above My unit is used primarily on a forage chopper. However, it could be adapted to other towed implements.

Important economic advantages now are being made available with my new spindle hub mount unit. My new construction gives the consumer the ability to purchase replacement pans separately, and not an entire unit, thus saving costs to the users. The spindle used is bigger than the original equipment offered which is another economic advantage. This allows the machine user to use heavier bearings resulting in less chance for the spindle to bend during use. Although this unit differs from the original equipment now supplied, it is designed to replace that unit without any modification to either the main frame or the wheels. This unit provides the support for a separate spindle and hub assembly.

SUMMARY OF THE INVENTION

According to my invention, I have provided a spindle hub mount unit for attachment to a wheel spindle including the improvement of a plate, holes in the plate to assist in securing the plate to a machine frame, an upright stub axle sleeve mounted on the plate, the plate having an offset plate hole with a lower end of the stub axle sleeve mounted in the offset plate hole, weld means attaching the stub axle sleeve to the plate when set into the offset plate hole, gussets mounted on the plate having gusset edges, means welding the gusset edges to an outside surface of the upright stub axle sleeve and to the plate, a bolt and nut assembly, aligned opposing stub axle sleeve holes through the stub axle sleeve above the plate with the bolt having a bolt shank extended through the aligned opposing stub axle sleeve holes for securing a lower end of a wheel spindle interiorly of the stub axle sleeve for bolted assembly together, and a pair of axially spaced set screws extended through the upright stub axle sleeve for engagement with an exterior surface of a wheel spindle to secure a wheel spindle from pivoting relative to the upright stub axle sleeve when mounted in assembly together.

Other features of my invention relate to the plate hole having a larger diameter than the upright stub axle sleeve, and weld means welding a lower end of the stub axle sleeve to an inside circular surface of the plate hole.

Still further features relate to the upright stub axle sleeve having a lower most annular stub axle sleeve edge positioned above the bottom surface of the plate in welded assembly.

Yet other features relate to a ⅛ inch annular gap being located between an outside surface of the upright tube and an inside annular edge of the plate hole, the weld means filling the gap and securing the outside surface of the upright stub axle sleeve to the plate.

Other and still further features of my invention relate to a spindle hub mount unit for attachment to a wheel spindle. The improvement includes a plate, holes in the plate to assist in securing the plate to a machine frame, an upright stub axle sleeve mounted on the plate, the plate having a plate hole with a lower end of the stub axle sleeve mounted in the plate hole, weld means attaching the stub axle sleeve to the plate when set into the plate hole, gussets mounted on the plate having gusset edges, means comprising welds securing the gusset edges to an outside surface of the upright stub axle sleeve and to the plate, a detachable fastener assembly for securing a wheel spindle in detachable assembly with the stub axle sleeve when a wheel spindle is telescoped interiorly at one end into the sleeve, aligned opposing stub axle sleeve holes through the stub axle sleeve above the plate with the detachable fastener assembly having a pin shank extended through the aligned opposing stub axle sleeve holes for securing a lower end of a wheel spindle interiorly of the stub axle sleeve for fastened assembly together, and a pair of axially spaced set screws extended through the upright stub axle sleeve for engagement with an exterior surface of a wheel spindle to secure a wheel spindle from pivoting relative to the upright stub axle sleeve when mounted in assembly together.

Yet other features of my invention concern a new combination of a spindle hub mount unit and a wheel spindle, the spindle having a transverse fastener hole adjacent on end, the unit including a plate, holes in the plate to assist in securing the plate to a machine frame, an upright stub axle sleeve mounted on the plate, the plate having an offset plate hole with a lower end of the stub axle sleeve mounted in the offset plate hole, weld means attaching the stub axle sleeve to the plate when set into the offset plate hole, gussets mounted on the plate having gusset edges, means comprising welds securing the gusset edges to an outside surface of the upright stub axle sleeve and to the plate, a bolt and nut assembly, aligned opposing stub axle sleeve holes through the stub axle sleeve above the plate, the sleeve holes being alignable with the transverse fastener hole in the spindle, the bolt having a bolt-shank extended through the aligned opposing stub axle sleeve holes and the transverse fastener hole securing a lower end of a wheel spindle interiorly of the stub axle sleeve in bolted assembly together, and at least a pair of axially spaced set screws extended through the upright stub axle sleeve engaged with an exterior surface area of the wheel spindle securing the wheel spindle from pivoting relative to the upright stub axle sleeve while in mounted assembly together.

DESCRIPTION OF THE PREFERRED EMBODIMENT

Figure 1:
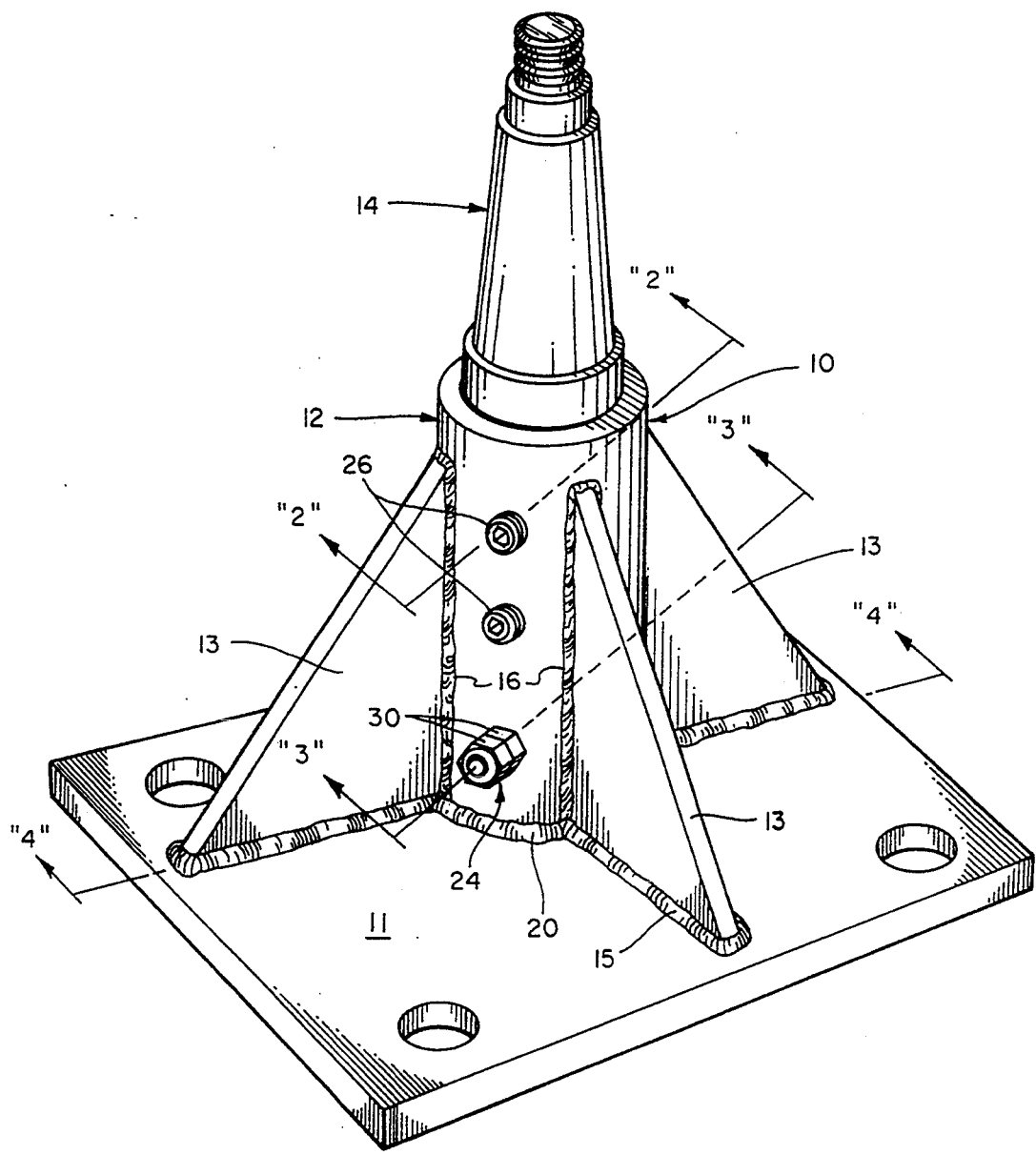
FIG. 1 is a perspective view of my new and improved spindle hub mount unit and with a spindle shown in a secured position on the mount.

The reference numeral 10 indicates generally a spindle hub mount unit embodying important features of my invention. The unit 10 includes a mounting plate 11, an upright stub axle sleeve 12, and a series of gussets 13 which in the illustrated embodiment includes three individual gussets. The upright stub axle sleeve 12 is adapted to receive a wheel spindle 14 and this wheel spindle is removably assembled with the stub axle sleeve and fastening means as will hereafter be discussed is provided to enable the sleeve to be firmly and securely attached with the spindle hub mount unit 10. The spindle 14 can be easily detached for replacement purposes when required without having to purchase an entire new spindle hub mount unit 10. This spindle has a stepped shaped outer configuration which is conventional for this type of a use.

Figure 4:
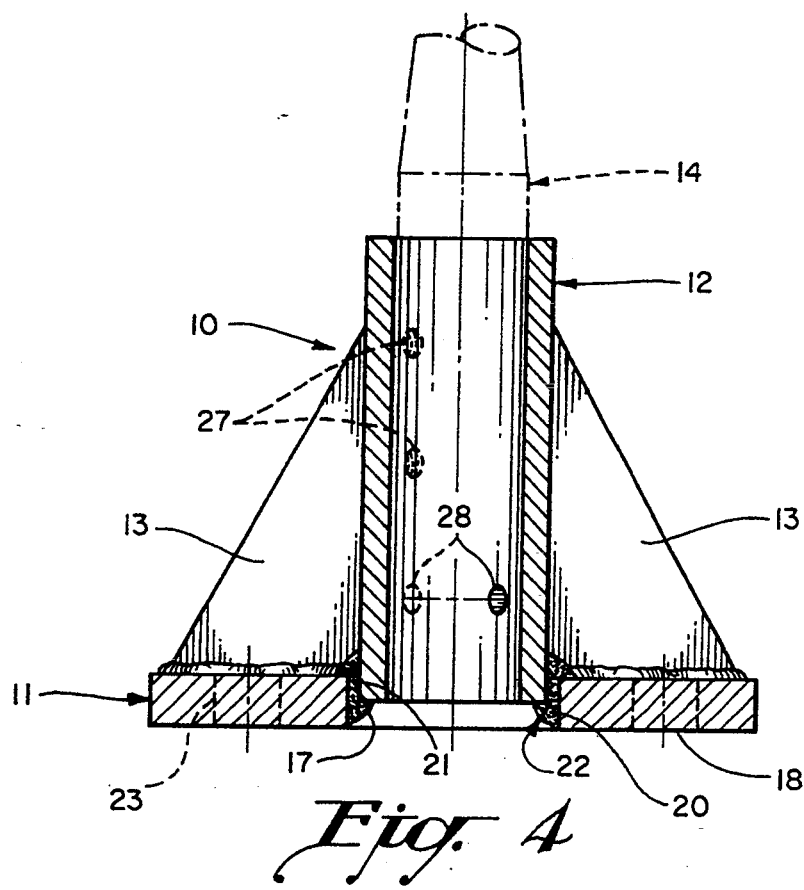
FIG. 4 is a vertical section with parts shown in elevation taken on the line 4—4 looking in the direction indicated by the arrows as seen in FIG. 1.
Figure 5:
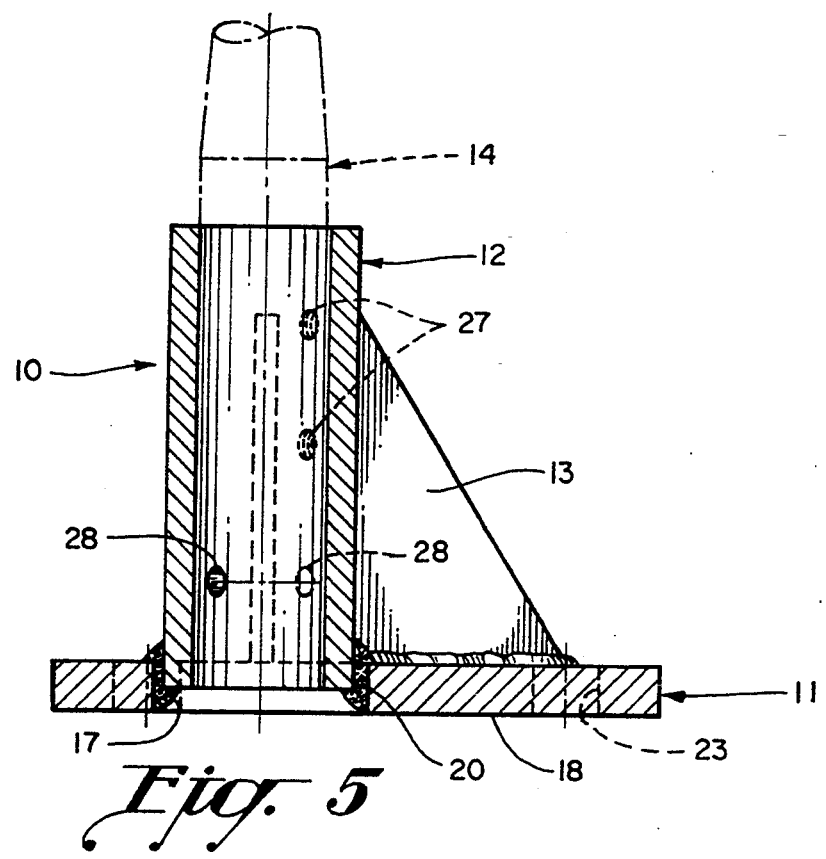
FIG. 5 is a vertical section through the spindle hub mount unit showing one side of the sleeve being free of a gusset.

The gussets 13 are welded at 15 and 16 to the plate 11. Similarly, the plate 11 has a tapered ring shaped weld 17 adjacent to a bottom surface 18 of the plate 11 (FIGS. 4 and 5). Now the plate 11 has an oversized opening 20 relative to an outside diameter of circular spindle hub surface 21 providing an annular gap 22 (FIG. 4) of about ⅛th inch. This gap 22 is located between the outside surface 21 of the upright tube and an inside annular edge of the plate hole 20. The weld 17 serves to fill the gap 22 and secure the stub axle sleeve 12 in an upright fixed position to the base plate 11.

In order to mount the base plate 11 onto a housing of a towed farming implement or attachment for a forage harvester, I have provided four bolt holes 23 at the corners of the plate 11. Bolts (not shown), or suitable fasteners, can be provided to attach the plate 11 to the farming unit or forage harvester (not shown) or any other suitable implement as may be required.

In order to locate the spindle 14 in a fixed position relative to the spindle hub mount unit 10 and more particularly relative to the upright stub axle sleeve 12, I have further provided fastening means which is illustrated in the form of a nut and bolt fastener assembly 24. This nut and bolt assembly 24 could be modified to employ a removable pin type fastener of any suitable different type, as may be required.

Figure 2:
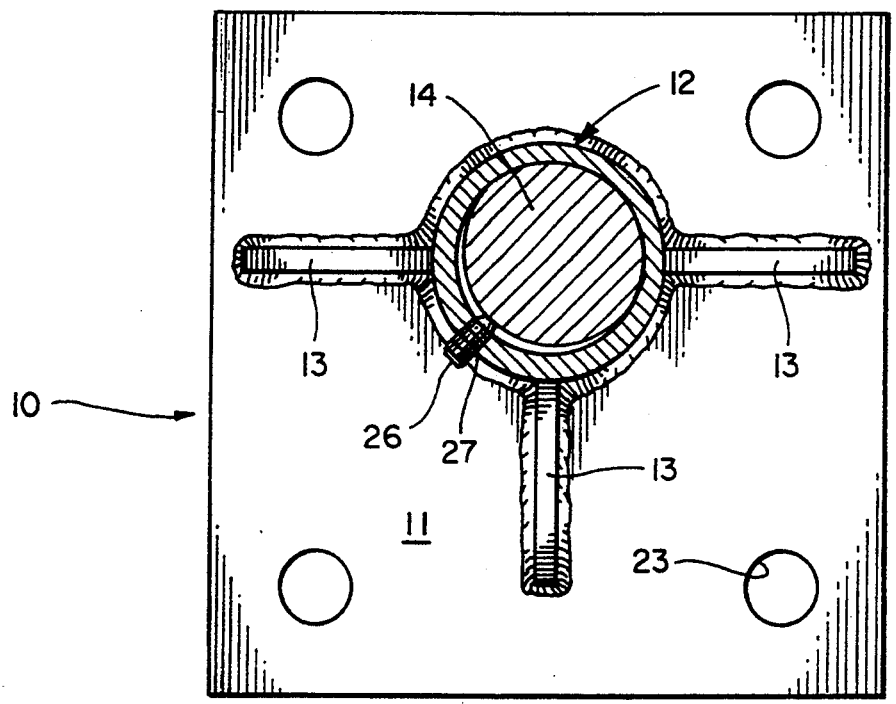
FIG. 2 is a vertical section with parts shown in elevation taken on the line 2—2 looking in the direction indicated by the arrows as seen in FIG. 1.

Located immediately above the nut and bolt assembly are a pair of set screws 26—26. These set screws 26 are mounted in threaded holes 27 inside of the upright stub axle sleeve 12 so that the set screws 26 can be threaded into the threaded holes 27 and be caused to bear against the spindle 14 (FIG. 2) to fix the spindle so that it can not rock or move with respect to the upright stub axle sleeve 12 or the unit 10.

Figure 3:
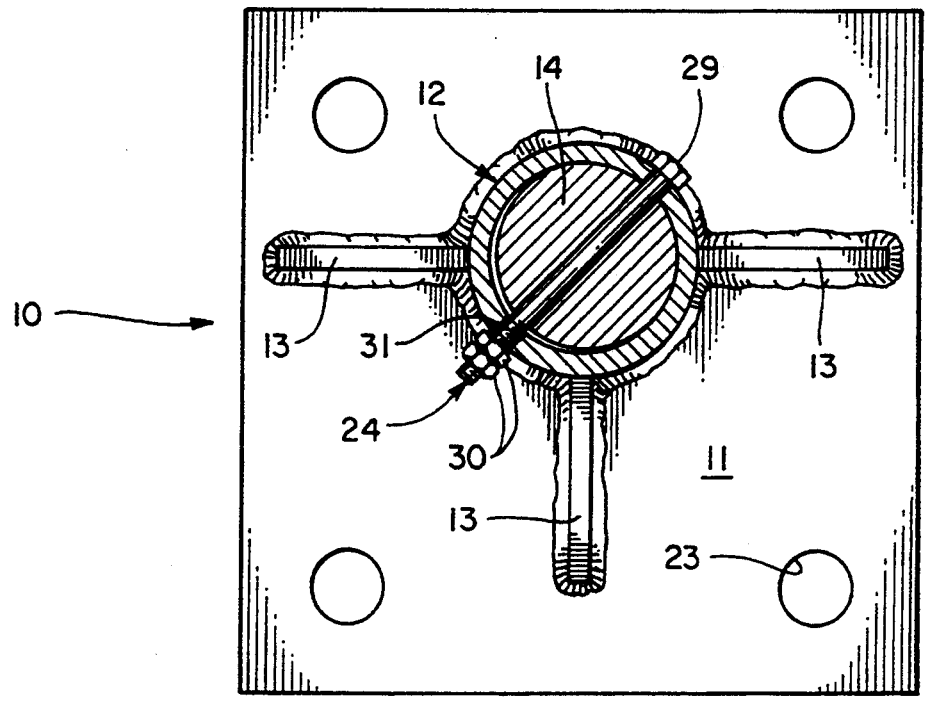
FIG. 3 is a vertical section with parts shown in elevation taken on the line 3—3 looking in the direction indicated by the arrows as seen in FIG. 1.

As stated before, the nut and bolt fastener assembly 24 serves to anchor and physically connect the bottom end of the spindle 14 to the upright stub axle sleeve 12. A pair of sleeve holes 28—28 (FIG. 4) are provided in opposite circumferential surfaces of the sleeve 12 so that the nut and bolt assembly 24, and more particularly bolt 29 (FIG. 3), can be caused to be extended into the holes 28—28 provided in a lower end of the spindle 12. I have employed a pair of nuts 30—30 (FIG. 3) to ensure that when the nuts 30—30 are mounted on threaded end 31 of the bolt 29, that the nuts 30—30 will act as a locknut to ensure that the bolts cannot be moved easily relative to one another to cause accidental disengagement of the nuts from the threaded end of the bolt.

The inside diameter of the tubular sleeve 12 accepts the outside diameter of the spindle 14. By using this means to mount the wheel spindle 14 to a hub assembly 31 (FIG. 6), it is possible to replace the spindle 14, bearings (not shown), hub, or even the base mount independently. The need to purchase the complete assembly is eliminated as required before on equipment of the type described above.

Figure 6:
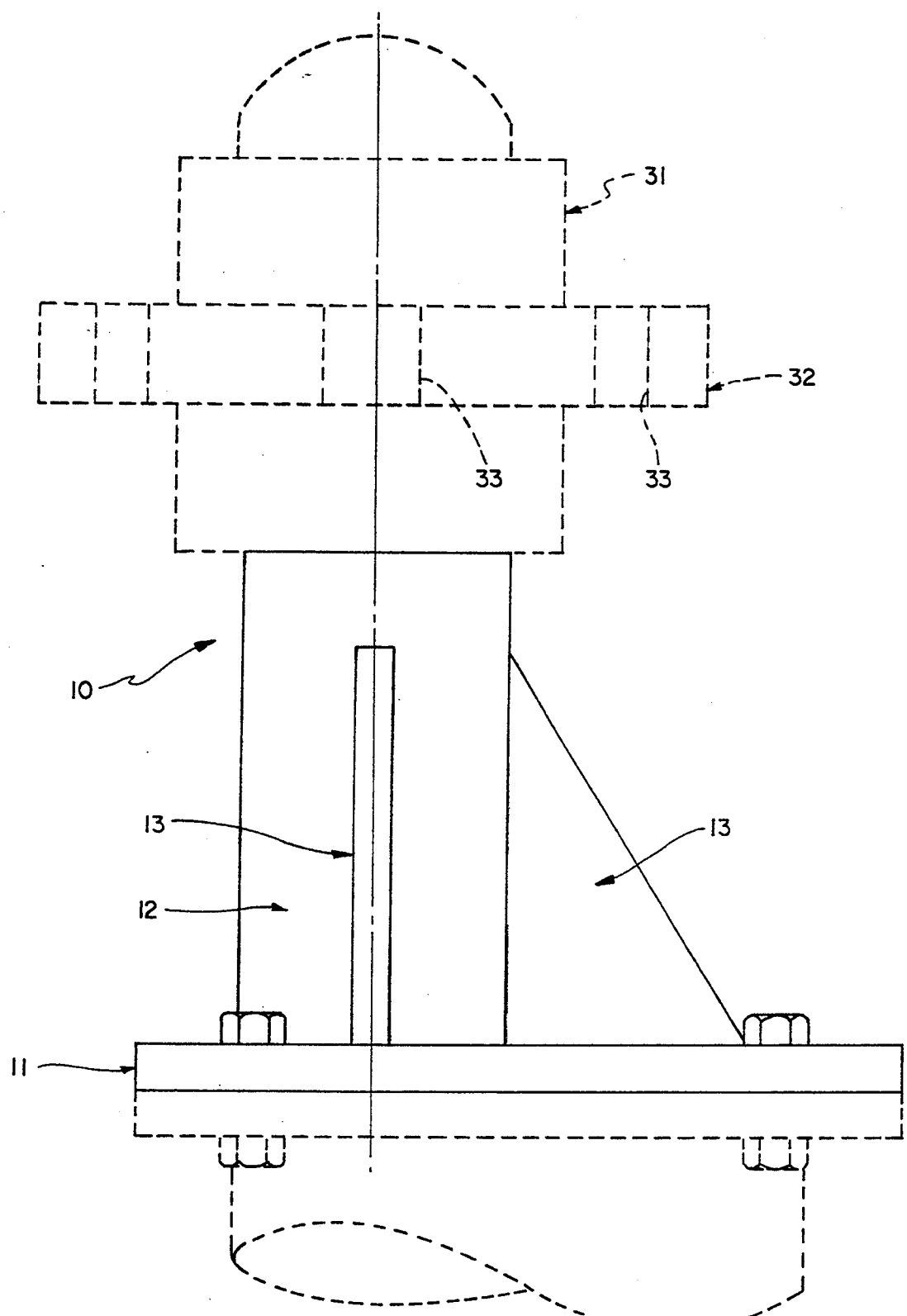
FIG. 6 is a side elevation of my new spindle hub mount unit and with a hub assembly atop the sleeve which hub assembly enables an implement wheel to be attached thereto.

A hub assembly 31 has been indicated in FIG. 6. This hub assembly is of a conventional construction. The hub assembly 31 is adapted to attach to a wheel of an implement in a conventional manner. To this end, the hub assembly is provided with a boss 32 that has a series of threaded holes 33 for receiving fasteners to secure the hub assembly to the wheel of the implement.

While the preferred form of the invention has been specifically illustrated and described herein, it will be apparent to those skilled in the art that modifications and improvements may be made to the form herein specifically disclosed. Accordingly, the present invention is not to be limited to the form herein specifically disclosed or in any other way inconsistent with the progress in the art promoted by this invention.

I claim

1. In a spindle hub mount unit for attachment to a wheel spindle, the improvement of a plate, holes in the plate to assist in securing the plate to a machine frame, an upright stub axle sleeve mounted on the plate, the plate having an offset plate hole with a lower end of the stub axle sleeve mounted in the offset plate hole, weld means attaching the stub axle sleeve to the plate when set into said offset plate hole, gussets mounted on the plate having gusset edges, means welding the gusset edges to an outside surface of said upright stub axle sleeve and to said plate, a bolt and nut assembly, aligned opposing stub axle sleeve holes through said stub axle sleeve above said plate with said bolt having a bolt shank extended through the aligned opposing stub axle sleeve holes for securing a lower end of a wheel spindle interiorly of said stub axle sleeve for bolted assembly together, and at least a pair of axially spaced set screws extended through the upright stub axle sleeve for engagement with an exterior surface of a wheel spindle to secure a wheel spindle from pivoting relative to the upright stub axle sleeve when mounted in assembly together.

2. The spindle hub mount unit of claim 1 wherein the plate hole has a larger diameter than said upright stub axle sleeve, and weld means welding a lower end of the stub axle sleeve to an inside circular surface of said plate hole.

3. The spindle hub mount unit of claim 2 wherein said upright stub axle sleeve has a lower most annular stub axle sleeve edge positioned above the bottom surface of the plate in welded assembly together.

4. The spindle hub mount unit of claim 3 wherein a ⅛ inch annular gap is located between an outside surface of said upright tube and an inside annular edge of said plate hole, the weld means filling the gap and securing the outside surface of the upright stub axle sleeve to said plate.

5. In a spindle hub mount unit for attachment to a wheel spindle, the improvement of a plate, holes in the plate to assist in securing the plate to a machine frame, an upright stub axle sleeve mounted on the plate, the plate having a plate hole with a lower end of the stub axle sleeve mounted in the plate hole, weld means attaching the stub axle sleeve to the plate when set into said plate hole, gussets mounted on the plate having gusset edges, means comprising welds securing the gusset edges to an outside surface of said upright stub axle sleeve and to said plate, a detachable fastener assembly for securing a wheel spindle in detachable assembly with said stub axle sleeve when a wheel spindle is telescoped interiorly at one end into the sleeve, aligned opposing stub axle sleeve holes through said stub axle sleeve above said plate with said detachable fastener assembly having a pin shank extended through the aligned opposing stub axle sleeve holes for securing a lower end of a wheel spindle interiorly of said stub axle sleeve for fastened assembly together, and a pair of axially spaced set screws extended through the upright stub axle sleeve for engagement with an exterior surface of a wheel spindle to secure a wheel spindle from pivoting relative to the upright stub axle sleeve when mounted in assembly together.

6. The spindle hub mount unit of claim 5 wherein the plate hole has a larger diameter than said upright stub axle sleeve, and weld means welding a lower end of the stub axle sleeve to an inside circular surface of said plate hole, the stub axle sleeve being spaced above a bottom surface of said plate.

7. The spindle hub mount unit of claim 6 wherein said upright stub axle sleeve has a lower most annular stub axle sleeve edge positioned above the bottom surface of the plate in welded assembly together.

8. The spindle hub mount unit of claim 7 wherein a ⅛ inch annular gap is located between an outside surface of said upright tube and an inside annular edge of said plate hole, the weld means filling the gap and securing the outside surface of the upright stub axle sleeve to said plate.

9. In combination a spindle hub mount unit and a wheel spindle, the spindle having a transverse fastener hole adjacent on end, the unit including a plate, holes in the plate to assist in securing the plate to a machine frame, an upright stub axle sleeve mounted on the plate, the plate having an offset plate hole with a lower end of the stub axle sleeve mounted in the offset plate hole, weld means attaching the stub axle sleeve to the plate when set into said offset plate hole, gussets mounted on the plate having gusset edges, means comprising welds securing the gusset edges to an outside surface of said upright stub axle sleeve and to said plate, a bolt and nut assembly, aligned opposing stub axle sleeve holes through said stub axle sleeve above said plate, said sleeve holes being alignable with said transverse fastener hole in said spindle, said bolt having a bolt shank extended through the aligned opposing stub axle sleeve holes and said transverse fastener hole securing a lower end of a wheel spindle interiorly of said stub axle sleeve in bolted assembly together, and at least a pair of axially spaced set screws extended through the upright stub axle sleeve engaged with an exterior surface area of said wheel spindle securing said wheel spindle from pivoting relative to the upright stub axle sleeve while in mounted assembly together.

* * * * *